DOUGLAS D. DOONAN
GARY B. MAXWELL
INVENTORS

BY Frank C. Parker
Charles C. Krawczyk
ATTORNEYS

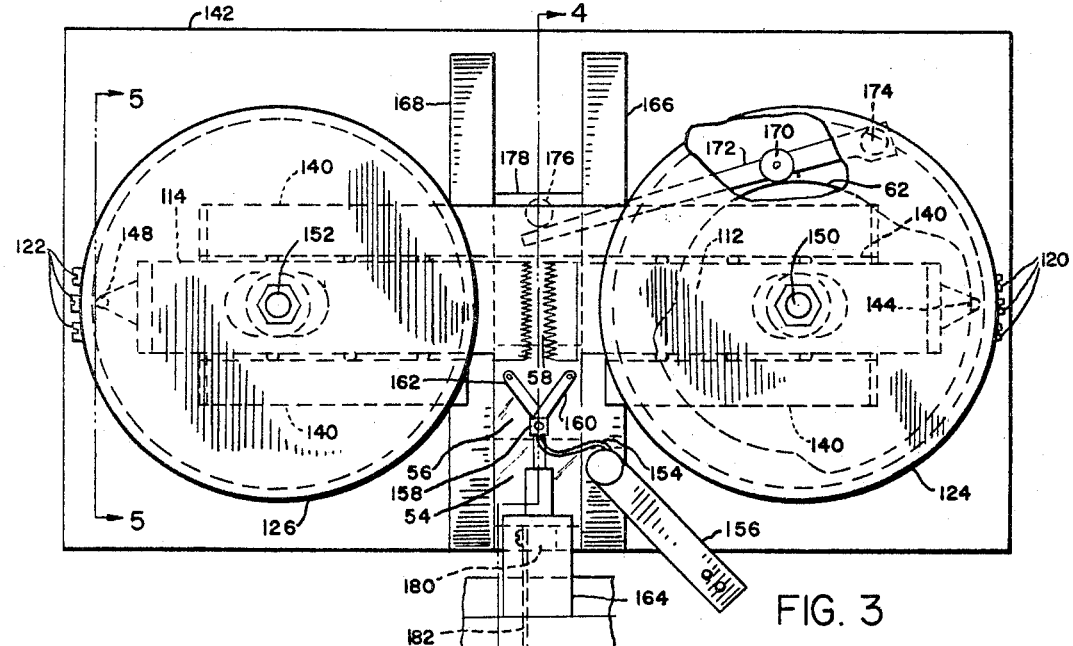
FIG. 3
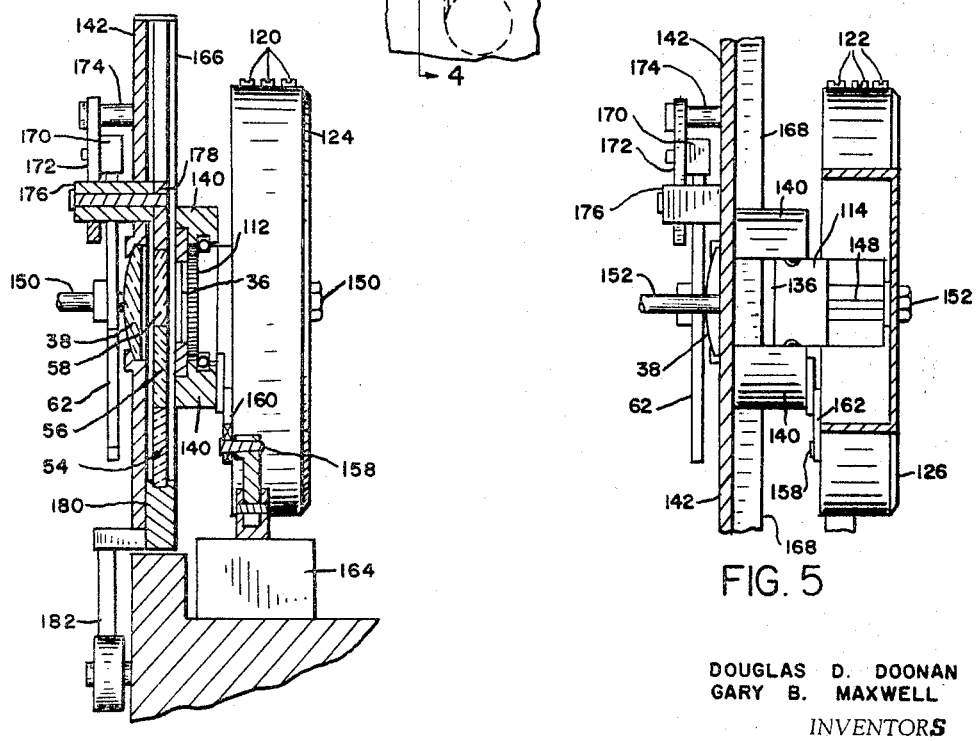
FIG. 4
FIG. 5
DOUGLAS D. DOONAN
GARY B. MAXWELL
INVENTORS
ATTORNEYS

United States Patent Office 3,431,054
Patented Mar. 4, 1969

3,431,054
MONOCHROMATOR DEVICE
Douglas D. Doonan, Irondequoit, and Gary B. Maxwell, Rochester, N.Y., assignors to Bausch & Lomb Incorporated, Rochester, N.Y., a corporation of New York
Filed Oct. 29, 1965, Ser. No. 505,683
U.S. Cl. 356—100
Int. Cl. G01j 1/32; G01n 21/22
11 Claims This invention relates to sources of radiant energy in general and more particularly to means for providing a source of monochromatic radiant energy.

Presently available sources of monochromatic radiant energy such as light (including wavelengths corresponding to the infrared, visible and ultraviolet waves) provide a radiant flux output that varies irregularly in energy level as a function of wavelength. These irregularities are due to the spectral characteristics of the source of radiant energy, the efficiency and the anomalies of the radiant flux dispersing device and the efficiencies of the optical system. If such sources of monochromatic radiant energy are employed to accurately measure the response of various devices and materials to monochromatic radiant energy (effectively a limited band of wavelengths) over a predetermined range of wavelengths, the measurements must be corrected to take these irregularities into account. These measurements can be greatly simplified by the use of a source of monochromatic radiant energy that provides a controlled or a constant level of radiant flux over the band of wavelengths to be scanned.

It is therefore an object of this invention to provide a new and improved controlled source of monochromatic radiant energy.

It is also an object of this invention to provide a new and improved source of monochromatic radiant energy having a controllable output energy level over a wide range of wavelengths.

It is also an object of this invention to provide a new and imporved source of constant monochromatic radiant energy that provides a controlled or a constant level of radiant flux over the band of wavelengths to be scanned.

It is also an object of this invention to provide a new and improved source of constant monochromatic radiant energy over a wide range of wavelengths.

A controlled energy monochromator device embodying the invention includes a source of radiant energy powered by a controllable power supply wherein adjustable control means are provided to control the amount of power applied to the source of radiant energy according to an adjustable preset pattern that varies with wavelength. A monochromator device receives the radiant flux through an entrance slit. The monochromator device includes means for dispersing the flux on an exit slit and means for variably scanning the spectrum of dispersed flux on the exit slit over a predetermined range of wavelengths to provide a variable monochromatic radiant flux output which effectively includes a limited band of wavelengths. A plurality of movable filters are positioned adjacent one of the entrance and exit slits. An adjustable slit is also positioned adjacent one of the entrance and exit sits. Drive means are coupled to the adjustable control means, the monochromator device, the filters and the adjustable slit in a manner so that as the monochromator device functions to provide a wide spectral range of monochromatic radiant flux at the exit slit, the control means, the filter and the adjustable slit cooperate to hold the energy level of the radiant flux output substantially constant or control the energy level in a desired output radiant flux versus wavelength characteristic.

The novel features which are considered to be characteristic of this invention are set forth with particularity in the appended claims. The invention itself, however, both as to its organization and method of operation as well as additional objects and advantages theerof, will best be understood from the following description when read in connection with the accompanying drawings in which:

FIG. 3 is an embodiment of an adjustable slit mechanism schematically illustrated in FIG. 2.

FIG. 4 is a section view of the adjustable slit of the FIG. 3 taken along the line 4—4.

FIG. 5 is a section view of a portion of the adjustable slit mechanism of FIG. 3 taken along line 5—5.

Figure 1:
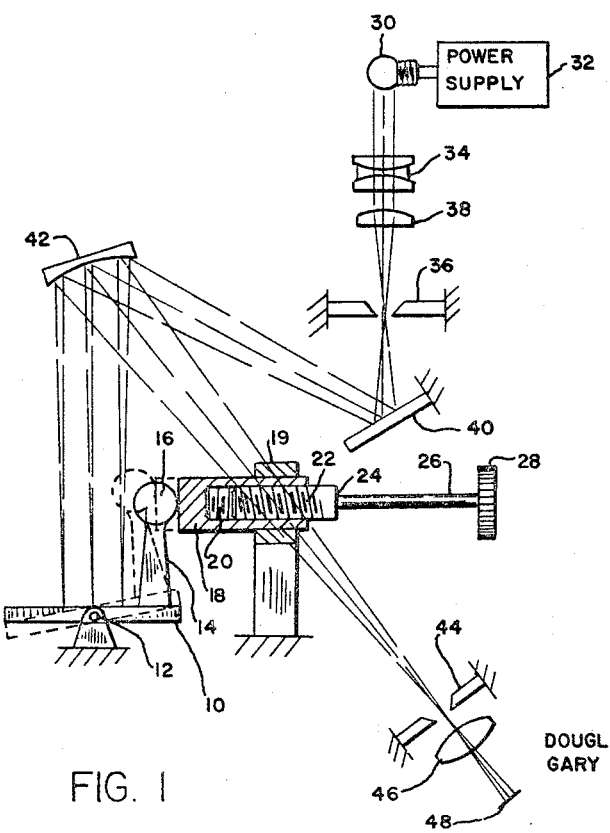
FIG. 1 is a schematic diagram of a commercially available type of monochromator device illustrating the prior art.

The prior art monochromator device schematically illustrated in FIG. 1 includes a diffraction grating 10 pivotally mounted on a pivot mounting 12. A pivot arm 14 is connected to one end of the diffraction grating 10. The pivot arm 14 includes a ball 16 on the end portion thereof which engages a sleeve 18. The sleeve 18 is slidably mounted on a mounting 19. The forward end of the sleeve 18 engages the ball 16 and pivots the diffraction grating 10 upon the operation of a drive mechanism (as shown in phantom). The inner periphery of the sleeve 18 contains a threaded portion 20 which threadedly engages a thread 22 of a push rod 24. The push rod 24 is coupled to rotate with a shaft 26 and a knob 28 connected thereto.

A source of radiant energy or light source 30, which may be for example a quartz iodine lamp, is energized by a constant output power supply 32 and provides the radiant flux or light for the monochromator device. The source of radiant energy 30 generates a range of wavelengths at least as great or greater than the desired wavelength range of the monochromator device. An optical condenser system 34 images the source of radiant energy 30 on an entrance slit 36. A collective lens 38, adjacent the condenser lens, collects the incident radiant flux and creates a uniform intensity bundle within the monocrhomator device.

A beam of radiant flux is transmitted by the entrance slit 36 and is reflected by a mirror 40 upon a collimator 42 which in turn collimates the beam of radiant flux and reflects it on the grating 10. The beam of radiant flux is diffracted by the grating 10 and is directed on the collimator 42 which in turn images the source of radiant energy 30 on an exit slit 44. Only a limited band of the spectrum of dispersed wavelengths are passed through the exit slit 44 to produce an effective monochromatic beam of radiant flux. The monochromatic beam of radiant flux passes through an exit collective lens 46 to form a monochromatic image of the diffraction grating 10 at a sample area 48.

Figure 6:
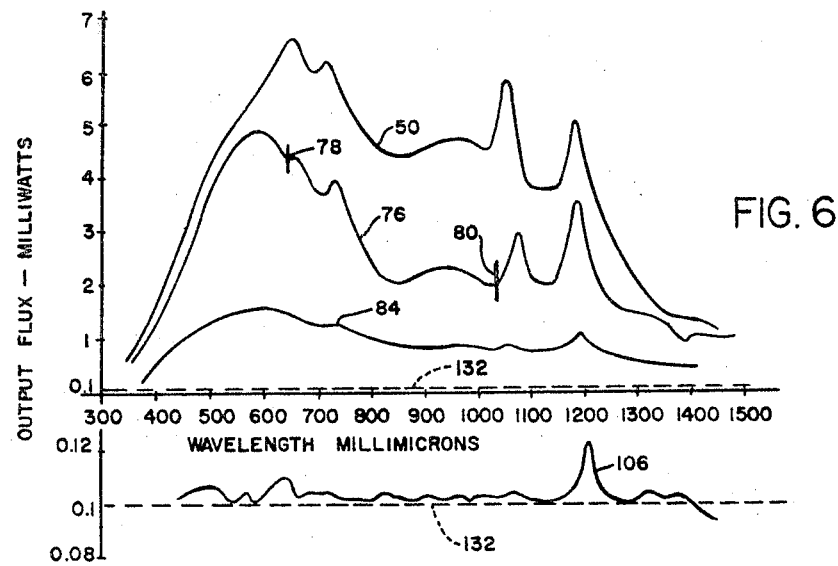
FIG. 6 is a graphic representation of the various radiant flux output levels versus wavelength characteristics of the monochromator devices of FIGS. 1 and 2 illustrating the effect of various control mechanisms of the device.

The curve 50 of FIG. 6 illustrates a typical radiant flux output characteristic (including undesirable higher order wavelengths) of the monochromator device of FIG. 1 employing a tungsten (quartz iodine) lamp, a diffraction grating having 600 grooves per millimeter blazed for peak performance in the wavelength range of 375–1400 millimicrons, and having a spectral slit width of 20 millimicrons. The irregularities in the curve 50 are due to the spectral characteristics of the source of radiant flux 30, the efficiency and anomalies of the diffraction grating 10 and the efficiencies of the optical system. Any measurements made with a monochromator device having such an output characteristic (curve 50) must be corrected on a point by point basis to take these irregularities into account. This is not only time consuming but also introduces errors.

The controlled energy monochromator device embodying the invention (FIG. 2) includes the components of the commercially available monochromator device of FIG. 1 with novel provisions for controlling the irradiance at the sample area 48. Where practical, the same reference numerals used to designate like components in FIGS. 1 and 2.

A shaft of a drive motor 50 is coupled to the shaft 26 to provide for a power drive for the controlled energy monochromator device. When the motor 50 is energized the shaft 26 is rotated and the diffraction grating 10 is pivoted about the pivot point 12 (as shown in phantom) to provide a means for automatically scanning the spectrum of dispersed radiant flux on the exit slit 44 through the available range of wavelengths of the monochromator.

A filter rack 52 is positioned between the entrance slit 36 and the collective lens 38 and includes three filter glasses 54, 56 and 58. The filter glasses 54, 56 and 58 are movable in directions as designated by the arrow 60 to follow the movement of a cam 62 through a cam follower 64 which is resiliently urged against the cam 62 by a spring 66. The cam is geared to rotate with the shaft of the drive motor 50 through the bevel gears 68, 70, 72 and 74 and the shaft 76. The filter glasses 54, 56 and 58 may be, for example, commercially available Corning filter glasses such as #1–58, #3–69 and #7–56 respectively. The filter glass 56 has an inconel neutral density overcoat to reduce its transmission equal to that of the other two filters at the crossover wavelengths. The filter glasses 54, 56 and 58 are selectively positioned in front of the entrance slit 36 to eliminate higher order wavelengths, provide for smoothing out the gross radiant flux variations with wavelength, and reduce stray radiation from the instrument.

The curve 76 of FIG. 6 illustrates the effect of the filter glasses 54, 56 and 58 in eliminating higher order wavelengths introduced into the system, etc. The crossover wavelengths are designated as points 78 and 80. The cam 62 is designed so that the filter glass 54 is positioned between the collective lens 38 and the entrance slit 36 for a range of wavelengths less than approximately 650 millimicrons (crossover point 78). The filter glass 56 is switched into position between the range of approximately 650–1050 millimicrons (between crossover points 78 and 80). For wavelengths greater than 1050 millicrons (crossover point 80) the filter glass 58 is switched into position. An embodiment of a mechanism for automatically positioning the filter glasses adjacent to the entrance slit is fully covered in a later portion of the specification with regards to FIGS. 3, 4 and 5.

The irregularities in the filtered radiant flux (curve 76, FIG. 6) are reduced by positioning a polarizer 82 before the exit slit 44. The polarizer 82 includes a stack of glass plates positioned at the polarization angle to polarize the radiant flux reflected from the collimator 42. The curve 84 illustrates the combined effect of the filter glasses and the polarizing plates 82. It should be noted that the irregular peaks are attenuated to a greater degree than the remainder of the curve since they tend to be strongly polarized.

The amount of radiant flux at the sample point 48 is primarily determined by controlling the amount of the radiant flux received at the entrance slit 36. This is accomplished by providing an electrically controllable power supply 84 to control the amount of radiant energy radiated by the source 30. A control signal generator means 89 (shown enclosed in the dashed block 87) is provided for controlling the output of the power supply 84 in a preset manner. The variable control signal generating means 89 includes preset means for adjusting the control signal as a function of wavelength so that as the monochromator device is scanned through its range of wavelengths, the output radiant flux versus wavelength characteristic can be controlled to take any desired shape. For example if a constant level of output radiant flux is desired, the preset means are adjusted to produce a control signal that is approximately inversely related to the filtered and polarized light output of the monochromator device as it is scanned through its range of wavelengths (FIG. 6 curve 84).

The power for the source of radiant energy 30 is provided by the electrically controllable power supply 84 which may be, for example, a commercially available Electronic Measurement Power Supply model PV32–10. The electrically controllable power supply is adapted to be connected to a source of energizing potential, such as the line voltage and provides a direct current output for energizing the source of radiant energy 30. The power supply 84 also includes means for electrically controlling the amplitude of the direct current output in response to a direct current control signal applied to a control terminal 86.

The variable control signal generating means 89 includes a potentiometer 88 having a movable arm 90 coupled to rotate with the drive motor 50 through the bevel gears 92, 94, 72 and 74 and the shaft 76. The potentiometer 88 is a multi-turn potentiometer including a resistive means 96 having a plurality of taps 98 at various positions along the resistive means. Each of the plurality of taps 98 are connected to separate movable arms 100 of a plurality of trimmer potentiometers 102 which act as the control signal preset means. One end of the trimmer potentiometers 102 is connected to ground and also to the negative terminal of a power supply 104 (designated as a battery) while the other end is connected to the positive terminal of the power supply 104. The movable arm 100 on the potentiometers 102 provides a direct current signal to the respective taps 98 of the resistive means 96. As the arm 90 rotates with the drive motor 50, the preset control signal (depending upon the setting of the potentiometers 102) is applied to the control terminal 86 of the power supply 84 thereby accordingly controlling the energy level output of the source of radiant energy 30 and the energy level of light received at the sample area 48. The curve 106 of FIG. 6 (plotted on an expanded scale) illustrates the combined effect of the filter glass, the polarizing plates and the controlled output of the source of radiant energy 30 with the potentiometers 102 preset to provide constant energy output. It should be noted that the potentiometers 102 can also be preset to control the shape of the output radiant flux versus wavelength characteristic to provide a desired response.

A fine control for presetting the amount of radiant flux at the sample area 48 is provided by an adjustable slit mechanism 110 positioned in the particular embodiment, adjacent the entrance slit 36. The adjustable slit includes two movable slit combs 112 and 114 spring biased through springs 116 and 118 to urge against the respective adjustable control elements or screws 120 and 122 located on a pair of rotary turrets 124 and 126 respectively. The rotary turrets 124 and 126 are coupled to be driven by the drive motor 50 through the bevel gears 128 and 130, 72 and 74 and the shaft 76.

The control elements 120 and 122 are adjusted to control the size of the slit opening between the slit combs 112 and 114 and thereby control the amount of radiant flux passing therethrough. If a constant energy flux output is desired the control elements are adjusted to take out the irregularities in curve 106 of FIG. 6 so that the output approaches that of the dashed curve 132. An embodiment of a mechanism for controlling the size of the slit opening between the slit comb 112 and 114 is fully set forth in a later portion of the specification with regards to FIGS. 3, 4 and 5.

A reference detector 134 is provided to calibrate the energy level of the radiant flux output at the sample area 48. The reference detector, by way of example may be an Eppley thermopile, can be pivoted about a pivot point 136 into the sample area 48 to take a direct reading of the output of the monochromator device. The reference detector 134 can also be used to monitor the output of the monochromator device while a sample is in the sample area 48 by positioning a mirror 136 into the beam of radiant flux to reflect the beam of radiant flux to the reference detector 134 (as illustrated by the dashed lines 138).

An embodiment of the filter rack 52 and the adjustable slit 110 is set forth in detail in FIGS. 3, 4 and 5. The comb slits 112 and 114 are ball bearing mounted to slide along the bearing plates 140, which are mounted on a mounting plate 142, to close or open the gap between the comb slits. The comb slits 112 and 114 include a cylindrical cam follower portion 144 and 148 (FIGS. 3 and 5) respectively which are adapted to engage successive ones of the adjustable control elements 120 and 122 (illustrated as screws) positioned about the periphery of the rotary turrets 124 and 126 respectively. The rotary turrets 124 and 126 are coupled to rotate with shafts 150 and 152 respectively, which in turn are geared (not shown) to rotate with the drive motor 50. For purposes of clarity only three control elements are illustrated on each turret, but any number can be arranged in any arrangement about the entire periphery of the turret to provide for the desired controlled movement of the slit combs 112 and 114.

The cam follower portions 144 and 148 are resiliently urged against the control elements 120 and 122 respectively by a spring 154 coupled between a spring mounting bracket 156 and pivot pin 158. The comb slits 112 and 114 are connected to the pivot pin 158 through the arms 160 and 162 respectively.

In operation, as the rotary turrets 124 and 126 rotate with the drive motor shaft, the cam followers 144 and 148 engage successive control elements 120 and 122 respectively to move the comb slits together or apart (as determined by the settings of the control elements 120 and 122) to control the amount of light energy or flux passing between the gap between the comb slits. The plunger of a relay 164 is connected to the pivot pin 158 to exert a downward force, when energized, to close the gap between the slit combs and disengage the cam follower 144 and 148 from the control elements 120 and 122 when motor 50 is put into high speed for a rapid scan type of operation.

Also mounted on the mounting plate 142 are a pair of filter glass guides 166 and 168. The filter glasses 54, 56 and 58 are placed in a groove in the guides 166 and 168 and move up or down in the grooves into position to filter the flux received by the entrance slit 36 (FIG. 4). In FIGS. 3, 4 and 5 the filter 58 is shown in position to filter the radiant flux applied to the entrance slit 36. The particular filter glass employed along with a given range of wavelengths is determined by the cam 62 coupled to rotate with the shaft 150. A cam follower 170 is mounted on a lever arm 172 which in turn is pivotally mounted to the mounting bracket 142 through a pin 174. The lever arm 172 engages a cam follower 176 mounted on a block 178 which engages the filter glass 58. One end of the filter glass 54 is engaged by a mounting block 180 which in turn is connected to a commercially available "negator" spring device 182. The "negator" spring device 182 provides a constant resilient downward force (as viewed in FIGS. 3 and 4) on the mounting block 180 and the filter glasses 54, 56 and 58 so that the cam follower 170 engages the lever 172 and the filter glasses are positioned between the collective lens 38 and the entrance slit 36 in a manner determined by the shape of the cam 62.

Figure 2:
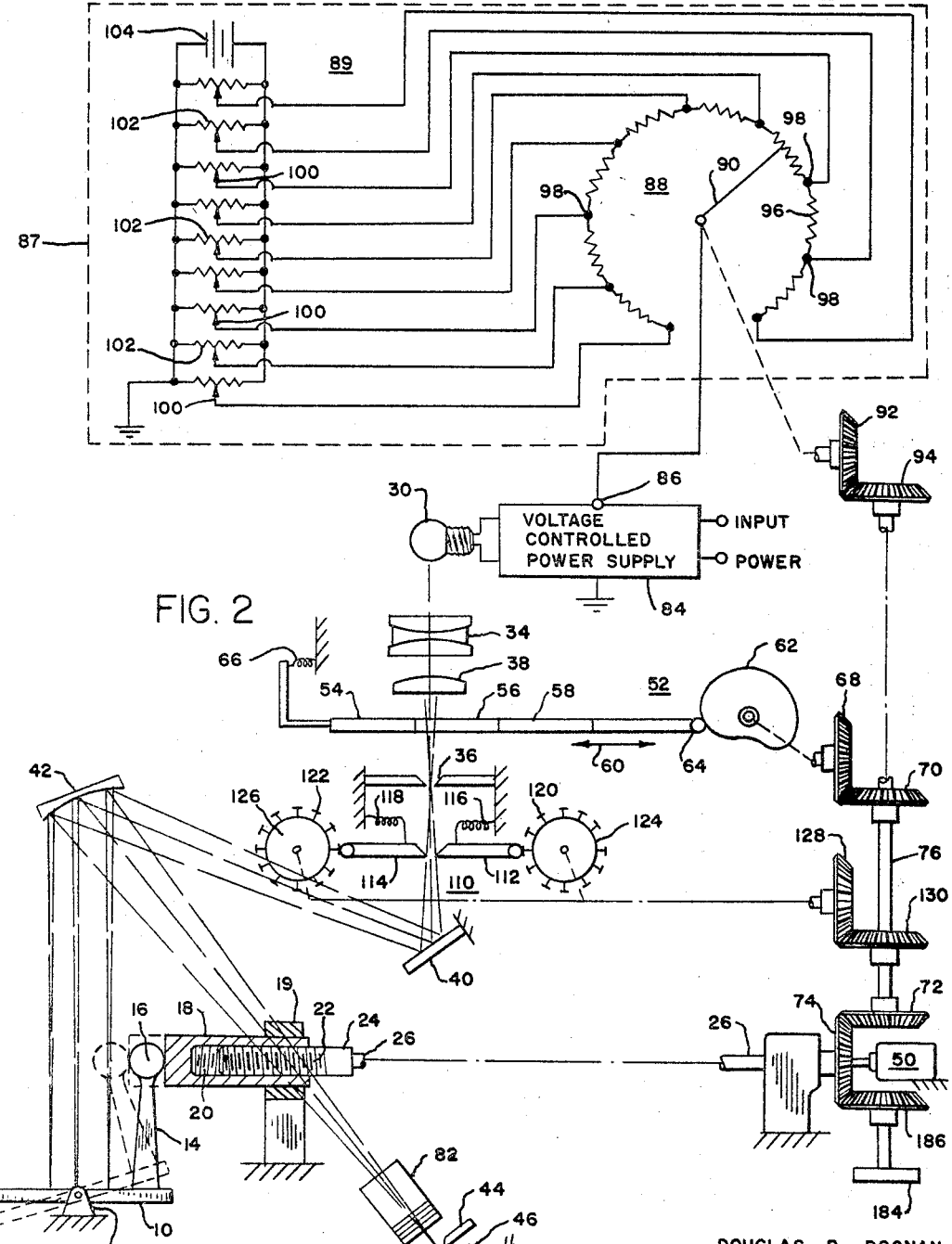
FIG. 2 is a schematic diagram of a controllable energy monochromator device embodying the invention.

The monochromator device of FIG. 2 is calibrated to produce a controlled or constant radiant flux output by pivoting the reference detector 134 into the sample area 48. The device can be manually operated to produce a monochromator flux output (effectively a limited band of wavelengths) in any portion of the available range of wavelengths by turning a knob 184 which is coupled to the drive mechanism through a bevel gear 186. First, the filter cam 62 is preset so that the filter glasses are switched into position as designated in the curve 76 of FIG. 6. Once the filter cam 62 is preset, the monochromator device is manually operated to various positions corresponding to given wavelength outputs and the potentiometers 102 and the control elements 120 and 122 corresponding to the particular wavelength output are adjusted to provide a desired output level at the particular wavelength or a constant output. As the range of wavelengths is subsequently scanned, the control components cooperate to reproduce the preset output radiant flux versus wavelength characteristic.

The controlled energy monochromator device of FIG. 2 when preset for constant output provides a substantially constant minimum output of 0.1 milliwatt at the sample area over a wavelength range from 375 millimicrons to 1400 millimicrons. The output energy level remains constant within plus and minus 2% absolute to the reference detector 100 and at least within plus and minus 3% relative to an absolute detector traceable to the National Bureau of Standards at a wavelength accuracy of at least plus and minus one millimicron. With the controlled energy monochromator of FIG. 2 the spectral characteristic of a device placed in the sample area 98 can be determined directly by simply monitoring its response as the range of wavelengths is scanned.

It should be noted, that although the filter rack 52 and the adjustable cam slit 110 are shown located adjacent the entrance slit 36 (FIGS. 2 and 4) either the filter rack 52 or the adjustable cam slit 110 or both, could be positioned adjacent the exit slit 44 and still provide the required amount of control over the amount of energy output.

A 10.7 turn such as a modified Series 3700 Duncan Electronics potentiometer having 27 taps is employed as the potentiometer 88. If a constant energy monochromator is desired at a higher energy level with less regulation, the polarizing plates 82 can be eliminated to produce a higher level output and a special potentiometer having a greater number of turns and more taps can be used to provide the required amount of regulation.

What is claimed is:
1. The combination comprising:
   a source of radiant flux;
   an electrically controllable power supply connected to apply electrical power to said source of radiant flux;
   a monochromator receiving said radiant flux on an entrance slit and including means for dispersing said radiant flux and means for variably positioning the spectrum of said dispersed radiant flux on an output slit to provide a monochromatic radiant flux output over a wide spectral range of wavelengths;
   adjustable control means for providing an electrical control signal that is preset to vary as a function of the wavelength of said monochromatic radiant flux output as said adjustable control means is positioned;
   circuit means connecting said control means to said power supply to apply said control signal thereto to control the amount of electrical power applied to said source of radiant flux;
   a plurality of movable filters mounted adjacent one of said slits;
   an adjustable slit mechanism mounted adjacent one of said slits;
   drive means connected to said adjustable control means, said drive means for variably positioning said dispersed radiant flux, said plurality of filters and said adjustable slit mechanism to scan the monochromator over said spectral range of monochromatic wave- lengths and to provide a controlled monochromatic energy level of radiant flux output for a said wide spectral range of radiant flux wavelengths.

2. The combination comprising:

a source of radiant flux having an output energy level determined by the amount of electrical power applied thereto and generating a range of radiant flux wavelengths corresponding to at least a predetermined range of wavelengths;

an electrically controllable power supply circuit connected to said source of radiant flux for applying electrical power thereto, the amount of power applied to said source of radiant flux being determined by applying an electrical control signal thereto;

a monochromator device receiving said radiant flux on an entrance slit and dispersing said radiant flux on an exit slit thereby providing an output radiant flux through said output slit having a limited band of wavelengths, said monochromator device including means for variably positioning said dispersed radiant flux on said exit slit so that said wavelengths included in said band of wavelengths is variable over said predetermined range of wavelengths;

drive means coupled to said means for variably positioning said dispersed radiant flux for scanning said monochromator device over said predetermined range of wavelengths;

a plurality of filters;

means coupled to said drive means for selectively positioning at least one of said plurality of filters adjacent to one of said slits for filtering said radiant flux applied thereto;

variable control signal generating means coupled to said drive means to generate a preset electrical control signal that varies in a manner that is approximately inversely related to the flux level of the monochromator device output flux as said monochromator device is scanned over said predetermined range of wavelengths;

circuit means coupling said variable control signal generating means to said power supply circuit to apply said electrical control signal thereto whereby the output energy level of said source of radiant flux is varied so that the energy level of flux received by said monochromator device is correspondingly varied in a manner that its output flux tends to remain substantially constant as said monochromator device is scanned over said predetermined range of wavelengths, and an adjustable slit mechanism positioned adjacent one of said slits and being coupled to said drive means to open or close the slit therebetween in a preset manner to cooperate with said electrical control signal to hold the flux level of said monochromator device output flux substantially constant.

3. The combination as defined in claim 2 wherein said adjustable slit mechanism includes:

a first and a second slit comb mounted for movement toward and away from each other to vary the gap between the first and second slit combs;

a cam follower mounted on each of said first and second slit combs;

first and second rotary turrets, each being coupled to rotate with said drive means;

a plurality of adjustable control elements mounted about the periphery of said rotary turrets, and means for mounting said first and second turrets adjacent said first and second slit combs respectively so that said first and second slit comb cam followers engage successive ones of said plurality of control elements on said first and second rotary turrets respectively as said rotary turret rotates with said drive means thereby controlling the gap between said first and second comb slits as a function of the settings of said control elements.

4. The combination as defined in claim 2 wherein said means for selectively positioning said plurality of filters includes:

a pair of guides for mounting said plurality of filters so that one of said plurality of filters can be selectively moved into position along one of said slits to filter the radiant flux applied to one of said slits;

a rotatable cam coupled to said drive means;

a cam follower connected to at least one of said plurality of filters; and resilient means coupled to urge said cam follower against said rotatable cam so that the position of the rotatable cam determines which one of said plurality of filters is positioned along one of said slits.

5. The combination as defined in claim 2 wherein said variable control signal generating means includes:

a multi-turn potentiometer including resistive means having a plurality of taps thereon and a rotatable contact that slides along said resistive means for making electrical contact thereto;

means for coupling said rotatable contact to said drive means;

a plurality of potentiometers each including a movable arm;

circuit means for applying a signal across said plurality of potentiometers, and circuit means for connecting said movable arms of said plurality of potentiometers to separate ones of said taps on said resistive means so that a control signal is applied to said rotatable contact that is a function of the positioning of said rotatable contact and the setting of said movable arms of said plurality of potentiometers.

6. The combination as defined in claim 2 wherein:

said adjustable slit mechanism comprises;

a first and a second slit comb mounted for movement toward and away from each other to vary the gap between the first and second slit combs;

a cam follower mounted on each of said first and second slit combs;

first and second rotary turrets each being coupled to rotate with said drive means;

a plurality of adjustable control elements mounted about the periphery of said rotary turrets, and means for mounting said first and second turrets adjacent said first and second slit combs respectively so that said first and second slit comb cam followers engage successive ones of said plurality of control elements on said first and second rotary turrets respectively as said rotary turret rotates thereby controlling the gap between said first and second comb slits as a function of the settings of said control elements, and wherein said means for selectively positioning said plurality of filters comprises:

a pair of guides for mounting said plurality of filters so that one of said plurality of filters can be selectively moved into position along one of said slits to filter the radiant flux applied to one of said slits;

a rotatable cam coupled to said drive means;

a cam follower connected to said plurality of filters; and resilient means coupled to urge said cam follower against said rotatable cam so that the position of the rotatable cam determines which one of said plurality of filters is positioned along one of said slits.

7. The combination as defined in claim 2 wherein:

said adjustable slit mechanism comprises;

a first and a second slit comb bearing mounted for movement toward and away from each other to vary the gap between the first and second slit combs;

first and second rotary turrets each being coupled to rotate with said drive means;

a plurality of adjustable screws mounted about the periphery of said rotary turrets, and means for mounting said first and second turrets adjacent said first and second slit combs respectively so that said first and second slit combs engage successive ones of said plurality of screws on said first and second rotary turrets respectively as said rotary turret rotates thereby controlling the gap between said first and second comb slits as a function the settings of said screws, and wherein said means for selectively positioning at least one of said plurality of filters comprises;

a pair of guides for slidably mounting said plurality of filters so that one of said plurality of filters can be selectively positioned adjacent one of said slits;

a rotatable cam coupled to said drive means;

a cam follower connected to said plurality of filters, and resilient means coupled to urge said cam follower against said rotatable cam so that the position of the rotatable cam determines which one of said plurality of filters is positioned adjacent one of said slits, and wherein said variable control signal generating means comprises;

a multi-turn potentiometer including resistive means having a plurality of taps thereon and a rotatable contact that slides along said resistive means for making electrical contact thereto;

means for coupling said rotatable contact to said drive means;

a plurality of potentiometers each including a movable arm;

circuit means for applying a direct current signal across said plurality of potentiometers, and circuit means for connecting said movable arms of said plurality of potentiometers to separate ones of said taps on said resistive means so that a direct current control signal is applied to said rotatable contact that is a function of the positioning of said rotatable contact and the settings of said movable arms of said plurality of potentiometers.

8. The combination as defined in claim 2 wherein polarizing means are included adjacent one of said slits for polarizing the radiant flux applied thereto.

9. A monochromator comprising:

a source of radiant flux;

an electrically controlled power supply circuit connected to apply electrical power to said source of radiant flux;

a potentiometer including a resistive means having a plurality of taps thereon and a movable contact making electrical contact with said resistive means;

circuit means for applying a plurality of potentials to said plurality of taps;

circuit means connecting said movable contact to said power supply to control the amount of electrical power applied to said source of radiant flux as a function of said plurality of potentials applied to said plurality of taps;

an entrance slit receiving said radiant flux;

a movable diffraction grating mounted for receiving said radiant flux from said entrance slit and for dispersing said radiant flux;

polarizing means mounted for receiving and polarizing said dispersed radiant flux;

an exit slit mounted for receiving said polarized dispersed radiant flux;

a plurality of filters mounted adjacent one of said slits to filter said radiant flux applied to said slit;

a movable comb slit mounted adjacent one of said slits, and drive means connected to said movable contact, said plurality of filters, said movable comb slit, said movable diffraction grating to control the energy level and the dispersion of the radiant flux to provide a predetermined energy level of radiant flux at said exit slit for a wide range of wavelengths.

10. A controlled output monochromator comprising:

a radiation source;

an electrically controllable power source for energizing said radiation source;

a monochromator including an entrance slit for receiving radiation from said source, means dispersing said radiation into a spectrum and wavelength driving means for providing a desired wavelength component of said spectrum on an exit slit;

first means for producing a control signal to control the electrical energy of said power source to be applied to said radiation source in accordance with said output wavelength component;

filter means positioned adjacent one of said slits, the wavelength characteristic of said filter means being variable;

second means for varying the width of one of said slits, and means for controlling said first and second means and said filter means in a ganged relationship with the operation of said wavelength driving means, thereby controlling the amount of radiant flux from said controlled output monochromator to provide predetermined radiant flux level versus wavelength characteristics.

11. The constant output monochromator as defined in claim 10 including polarizing means positioned in the radiation path of said constant output monochromator subsequent to said dispersing means.

References Cited

UNITED STATES PATENTS 3,216,315   11/1965   Keller _____ 88—14

JEWELL H. PEDERSEN, *Primary Examiner.*

V. P. McGRAW, *Assistant Examiner.*